(12) United States Patent
Stefani

(10) Patent No.: US 12,505,051 B2
(45) Date of Patent: Dec. 23, 2025

(54) PROGRAMMING APPARATUS COMPRISING DEVICES FOR WIRELESS COMMUNICATION

(71) Applicant: Claudio Stefani, Pordenone (IT)

(72) Inventor: Claudio Stefani, Pordenone (IT)

( * ) Notice: Subject to any disclaimer, the term of this patent is extended or adjusted under 35 U.S.C. 154(b) by 59 days.

(21) Appl. No.: 18/780,555

(22) Filed: Jul. 23, 2024

(65) Prior Publication Data
US 2025/0036576 A1    Jan. 30, 2025

(30) Foreign Application Priority Data
Jul. 24, 2023   (IT) .................. 102023000015486

(51) Int. Cl.
  *G06F 13/10* (2006.01)
  *H04W 24/06* (2009.01)
  *H04W 84/12* (2009.01)

(52) U.S. Cl.
  CPC ............ *G06F 13/10* (2013.01); *H04W 24/06* (2013.01); *G06F 2213/40* (2013.01); *H04W 84/12* (2013.01)

(58) Field of Classification Search
  None
  See application file for complete search history.

(56) References Cited

U.S. PATENT DOCUMENTS 11,194,374 B2 * 12/2021 Hamlin ................. G06F 1/3293
2021/0119632 A1    4/2021 Zhu et al.

OTHER PUBLICATIONS

Search Report;Jan. 31, 2024.

* cited by examiner

*Primary Examiner* — Scott C Sun
(74) *Attorney, Agent, or Firm* — Patshegen IP; Moshe Pinchas

(57) ABSTRACT

Programming device (300) including: a central control device (3) configured to manage the programming of a plurality of external devices to be programmed (PD1-PDN) and such as to store a plurality of programming data, a plurality of programming procedures of the devices to be programmed (PD1-PDN) and a plurality of configuration parameters; a plurality of peripheral control devices (AM1-AMN) each connectable to a related external device to be programmed (PD1-PDN) and such as to receive from the central control device (3) a corresponding sub-plurality of programming data intended for the corresponding external device to be programmed (PD1-PDN), a corresponding sub-plurality of programming procedures and a corresponding sub-plurality of configuration parameters. The device further including: a first wireless telecommunication device (4) connected to the central control device (3) and such as to irradiate wireless signals corresponding to the plurality of programming data and to the plurality of configuration parameters; a plurality of second wireless telecommunication devices (WM1-WMN) each connected to one of the said peripheral control devices (AM1-AMN) and each meant to receive by means of said wireless signals the corresponding sub-plurality of programming data and the corresponding sub-plurality of configuration parameters.

16 Claims, 3 Drawing Sheets

PROGRAMMING APPARATUS COMPRISING DEVICES FOR WIRELESS COMMUNICATION

TECHNICAL FIELD

The invention herein is related to programming devices of programmable devices such as, without being limited to, devices usable in In-System Programming (ISP) systems.

PRIOR ART

Programming devices distributed for In-System Programming (ISP), providing a coordination central module, being arranged in a main part of the device, and a plurality of programming peripheral modules being arranged inside a interchangeable part to run close to the programmable ISP devices are known. ISP devices are assembled on electronic boards Printed Circuit Board Assembly (PCBA).

Furthermore, the main part of the device is provided with the proper electrical and electronical part allowing the general functions of the whole system: power supply, machine management and the other specific functions.

The interchangeable part is combined with the main part of the device such as to allow the management of a specific type of electronic boards PCBA.

Generally, an interchangeable part is set up to manage one or more PCBA boards which in turn house one or more programmable devices ISP, even different from each other. Once the interchangeable part has been connected from the mechanical, electrical and electronic point of view to the main device, it connects such device with the ISP devices assembled on the PCBA boards by means of a contact system (e.g. "bed of nails", "pogo pins" or others) to carry out the required programming procedures.

The contribution of the interchangeable part may be a passive one, and therefore limited to a pure connection to the ISP devices via wiring, connectors and contact systems, or it may be an active one, and therefore providing in the interchangeable part further components that make functions intended for a specific application or improving the offered functions by the main part of the device available.

Typically, the second option represents the application of a distributed modular programming system ISP, in which the coordination central module is installed in the main part of the device and the programming peripheral modules are installed inside the interchangeable part.

It should be noted that the arrangement of the peripheral modules inside the interchangeable part of the machine allows to:
- chose the number and type of installed peripheral modules based on the specific application, related to the corresponding interchangeable part, and therefore based on the number and type of the ISP devices assembled on the PCBA boards;
- position the programming peripheral modules close to the programmable ISP devices so to shorten the length of the connection and therefore considerably increase the signal quality giving the opportunity to use the highest communication frequency.

The connection between the central module and the peripheral modules of a programming device occurs via a proper wiring that, in some cases, provides high frequency transmission lines (USB, Ethernet LAN, . . . ) guaranteeing the possibility to interchange data and commands at a high speed. More particularly, such connection is implemented with a connection composed of one or more high frequency differential wired transmission/reception lines.

The document WO2020250017 describes a programming device of electric devices of the above described type.

The Applicant has noted that the implementation of the connection between central module and peripheral modules causes a complex and expensive process requiring the following elements:
- an adequate wiring inside the main part of the device to connect the central module to the area close to the interchangeable module: the wiring is composed of a certain number of cables of a proper length, that can support the required transmission speed; the more the peripheral modules increase the more the number of cables increases and consequently both the connection size and its cost increase;
- an adequate connection system between the main part of the device and the interchangeable part: the insertion connectors, allowing to bring the signals inside the interchangeable part, are more and more expensive and mechanically bulky the more the required performances in terms of frequency of the signal to be conveyed (in many cases they may not support such a frequency) and of the minimum supported number of coupling cycles of the connection system increase; furthermore, once the connection system is being defined, characterising the main part of the device in relation to both the connector type and the maximum number of peripheral supported modules, it cannot be augmented in all the interchangeable parts assembled in the device;
- an adequate wiring inside the interchangeable part to join the connection system to the peripheral modules: the peripheral modules, installed in the interchangeable part, have to be connected to the connector via a certain number of cables being of a proper length, being able of supporting the required transmission speed; the more the peripheral modules increase the more the number of cables increases and consequently both the connection size and its cost; in many cases the available space inside the interchangeable part may be limited.

SUMMARY OF THE INVENTION

Aim of the invention herein is to propose a programming device, being of the type providing a central control device and a plurality of peripheral control devices, providing less complex and bulky connection modes compared to those of the known above-mentioned prior art.

It is an object of the invention herein a programming device as defined by claim 1 and its particular embodiments described in the dependent claims 2-13. Furthermore, it is an object of the invention herein a programming system as described by claim 14 and its particular embodiments defined in claims 15 and 16.

DETAILED DESCRIPTION

Figure 1:
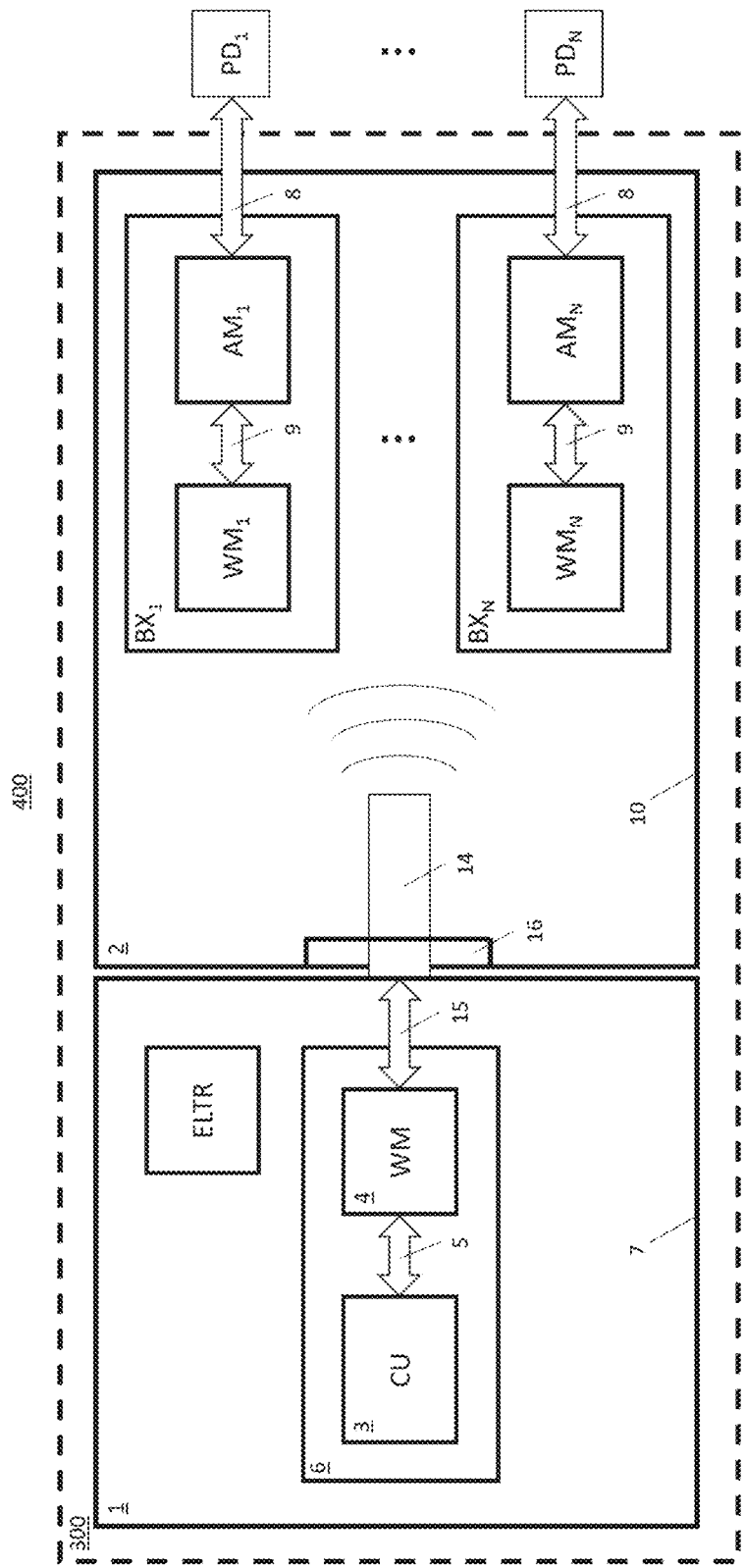
FIG. 1 schematically shows an embodiment of a programming system of devices to be programmed.

FIG. 1 schematically shows an embodiment of a programming system 400 including a programming device 300 and one or more devices to be programmed $PD_1$-$PD_N$.

The programming device 300 including a management device 1, or coordination central module, and a programming execution device 2, also called interchangeable part. The programming execution device 2 (called hereinafter, for the sake of brevity, "execution device 2") is connected for the data transmission/reception, information and/or commands to the management device 1 and to the devices to be programmed $PD_1$-$PD_N$. It should be noted that the programming device 300 may also include programming execution devices in addition to the device 2 (i.e. interchangeable parts) and dedicated to further groups of devices to be programmed (i.e., to devices to be programmed concerning other applications). Therefore, more than one programming execution device can be provided to be used instead of the one shown in FIG. 1.

The programming device 300 may be, for example, a distributed programming system being of the In-System Programming (ISP) type, i.e. a system in which the programming of a component occurs when the component itself has already been installed on its own circuit board. As it has already been outlined, the ISP devices are assembled on electronic boards Printed Circuit Board Assembly (PCBA).

The programming device 300 is also usable for the not ISP programming and that is for the programming of "off-line" devices, not being assembled on a PCBA. In such a case the devices to be programmed $PD_1$-$PD_N$ are arranged in related socket modules. A socket module is an interlocking mechanism clamping the device to be programmed and allowing to let the pins of the device and the device carrying out the programming to be in contact.

Furthermore, the programming system 400 can be integrated with functions allowing to carry out tests on the devices to be programmed $PD_1$-$PD_N$ and on the related PCBA boards. For the purposes of the description herein with the term "programming of a device" the programming (writing of the device) and other contingent procedures like the cancellation/initialization of the device, the verification of the correct cancellation/initialization of the device, the verification of the programming (the reading of the device), etc. is intended. Similarly, with the term "device to be programmed", the device being object of a programming is intended.

Each one of the devices to be programmed $PD_1$-$PD_N$ is an integrated circuit provided with a volatile or non-volatile memory. For example, the programmable device $PD_1$-$PD_N$ may be one of the following devices: a PROM memory (Programmable Read-Only Memory), an EPROM memory (Erasable PROM), an EEPROM memory (Electrically Erasable PROM), a NOR/NAND Flash memory, a microprocessor/microcontroller (that can include different types of memories), a FPGA (Field Programmable Gate Array).

Figure 2:
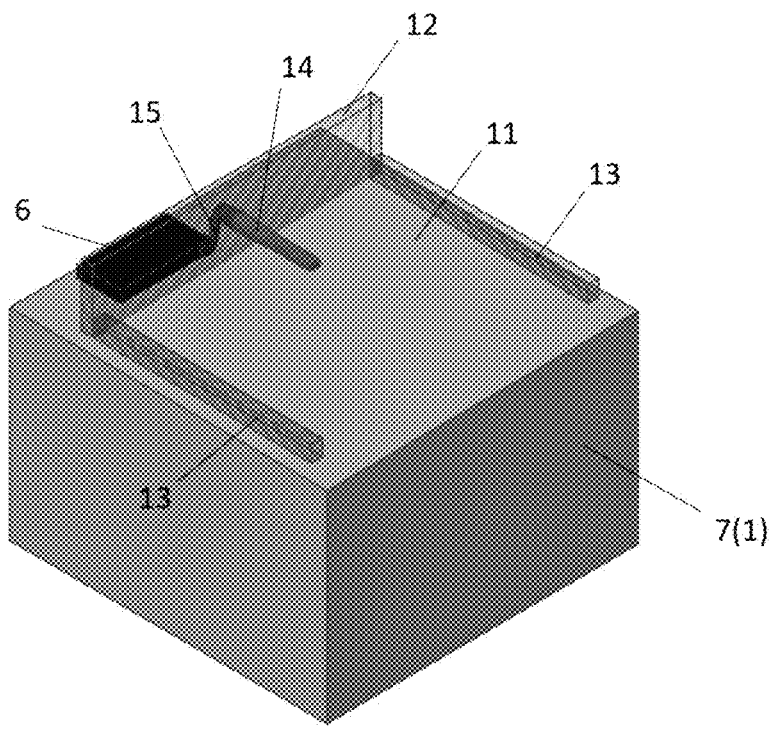
FIG. 2 shows an example of boxes of a programming management device usable by said programming system.

As shown also in FIG. 2, the management device 1 includes a central control device 3 (CU) and a wireless telecommunication device 4 (WM).

The central control device 3 includes a processing unit and memories (volatile and non-volatile) and it can be a computer, a microprocessor, a microcontroller or another configurable processing device, like a FPGA. For example, the central control device 3 could include one of the following devices: a SOC (System-On Chip) device, SOC-FPGA, ASIC (Application Specific Integrated Circuit), or another device with comparable functions, with volatile and/or non-volatile storage devices.

The wireless telecommunication device 4 includes transreceiver suitable to receiver/send radio signals, i.e. electromagnetic waves at radio frequencies (frequency between 0 and 300 GHz) giving appropriately coded information.

For example, the wireless telecommunication device 4 can be suitable to connect to a non-wired network and, especially, it can use the Wi-Fi technology. According to a specific example, it is possible to use Wireless LAN Wi-Fi 802.11ac modules guaranteeing, when the propagation environment of the signals allows it, transfer speed up to 400 Mb/s (i.e. 50 MB/s). With this type of communication system, the management even of a high number of unities being part of the wireless network occurs in a standard, dynamic and flexible manner.

The wireless telecommunication device 4 can be provided with an integrated antenna (not shown in the figures) being used for the communications with the execution device 2. Another embodiment will be described hereinafter using an antenna outside the wireless telecommunication device 4.

The central control device 3 and the wireless telecommunication device 4 are both in a mutual communication via a high-speed connection 5 such as, e.g., a USB connection or another. According to a special embodiment, the central control device 3 and the wireless telecommunication device 4 are both housed in the same first box module 6.

The management device 1 is also provided with a proper electric and electronic part allowing the general functions of the programming system 400: power supply, management from the outside of the system itself, and other specific functions. These further components are schematically represented in FIG. 1 as an ELTR block.

Furthermore, according to a special example, the management device 1 is housed in a first box 7 (advantageously, a metallic one) such as to provide for an adequate protection of the device itself.

Figure 4:
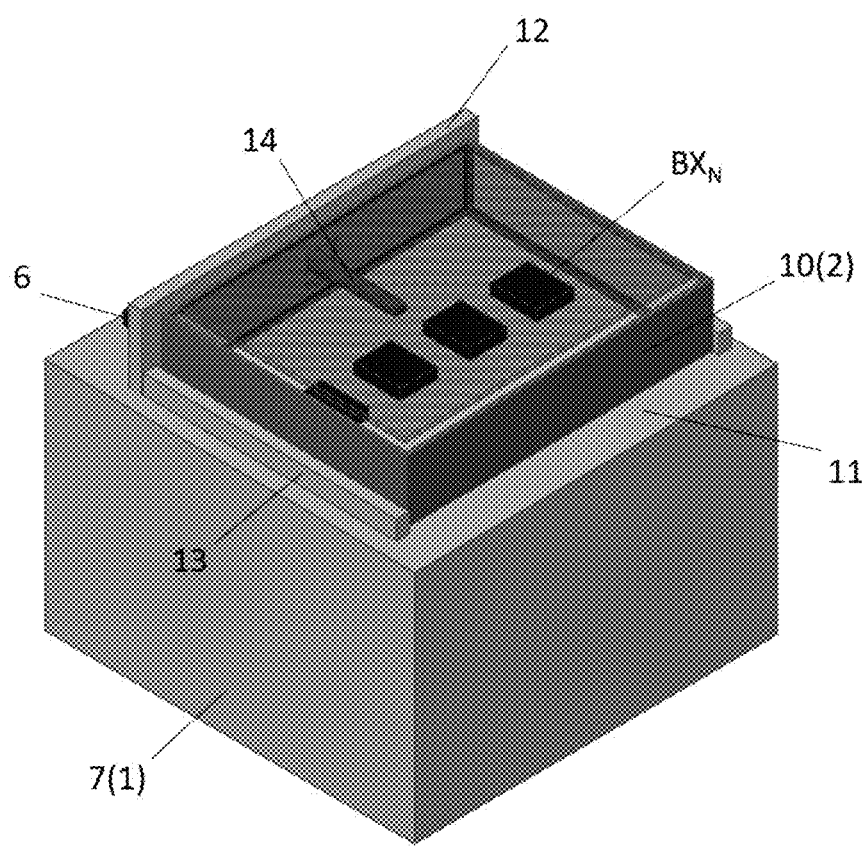
FIG. 4 shows an assembling exemplary embodiment of the management device and of the execution device.

As shown in the example of FIGS. 2 and 4, the ELTR block is arranged inside the first box 7 while the first box module 6 is arranged on a shelf 11 (for example, an upper wall) of the first box 7; such shelf 11 may be in turn covered by a closing element (not shown).

According to a possible embodiment example, on the shelf 11 of the first box 7 there are the following being arranged: a separation wall 12 and two parallel guides 13, orthogonal to the separation wall 12, whose function will be explained hereinafter.

The execution device 2 includes one or more peripheral control devices $AM_1$-$AM_N$, each one connected to a related device to be programmed $PD_1$-$PD_N$. The peripheral control devices $AM_1$-$AM_N$ may be implemented similarly to the above-described central control device 3. Particularly, each peripheral control device $AM_1$-$AM_N$ may be one of the following devices: SOC, SOC-FPGA, FPGA, ASIC, or another device with comparable functions, being put beside volatile and/or non-volatile storage devices.

It should be noted that the type of each peripheral control device $AM_1$-$AM_N$, forming part of the execution device 2, is being chosen considering the type of the related device to be programmed $PD_1$-$PD_N$. The programming system 400 will be provided with different execution devices 2 designed to run on PCBA boards being different in turn associated to a specific combination of devices to be programmed $PD_1$-$PD_N$. Therefore, the programming execution device 2 constitutes, e.g., an interchangeable part being aimed to be replaced based on the configuration of the devices to be programmed $PD_1$-$PD_N$.

Each peripheral control device $AM_1$-$AM_N$ being connected to a corresponding device to be programmed $PD_1$-$PD_N$ via a wired connection 8. As an ordinary skill in the art can easily guess, the case of a peripheral control device parallelly managing more than one device to be programmed is not excluded from the possible embodiments.

Furthermore, the execution device 2 includes one or more wireless telecommunication peripheral devices $WM_1$-$WM_N$, such as to be put into communication with the wireless telecommunication device 4 of the management device 1 and each one being connected via a corresponding high-speed connection 9 (e.g., a USB connection or another) to the corresponding peripheral control device $AM_1$-$AM_N$.

The wireless telecommunication peripheral devices $WM_1$-$WM_N$ (hereinafter, for the sake of brevity, "peripheral wireless devices") operate according to a telecommunication system being compatible with the system used by the wireless telecommunication device 4 of the management device 1.

Particularly, the wireless peripheral devices $WM_1$-$WM_N$ are similar to the wireless telecommunication device 4 and therefore they may rely, according to an example, on the Wi-Fi technology. More particularly, wireless peripheral devices $WM_1$-$WM_N$ can use Wireless LAN Wi-Fi 802.11ac modules, also providing an integrated antenna.

It should be noticed that, according to a particular embodiment, each peripheral wireless device $WM_1$-$WM_N$ and the corresponding peripheral control device $AM_1$-$AM_N$ are housed in a corresponding second box module $BX_1$-$BX_N$.

Furthermore, the components of the execution device 2 are, advantageously, arranged in a second box 10, preferably realised in metal, so to assure an adequate protection of the components arranged in it.

In the case that the programming system 400 provides a plurality of execution devices 2, each one is advantageously arranged in a corresponding second box (similar to the second box 10). Advantageously, each one of such second boxes is completely replaceable with the related content.

For example, the second box 10 (exemplarily having the shape of a drawer) can be arranged above the shelf 11 so to lean towards the separation wall 12 and to be blocked between the guides 13, as shown in FIG. 4.

According to the above-mentioned, the wireless telecommunication device 4 of the management device 1 is provided with an integrated antenna, but an embodiment (as the one shown in the figures) is possible, in which at least an antenna 14 outside the wireless telecommunication device 4 is being provided, preferably also outside the first box module 6 and the first box 7. According to a special embodiment, the antenna 14 has a rod shape but it could present also other shapes compatible to the procedure described hereinafter.

For example, (as it is also represented in the figures), the antenna 14, connected to the wireless telecommunication device 4 by means of a cable 15 (such as, a RF cable), protrudes towards the outside of the first box module 6. Particularly, the antenna 14 can be oriented, so that when the second box 10 is being inserted between the guides 13, it passes through a slot 16 being present in the second box 10, therefore being extended inside such a second box. The slot 16 has such a dimension to avoid that at introduction stage of the antenna 14 a damage and/or contact could occur.

The embodiment providing that the antenna 14 extends inside the second box 10, prevents the electromagnetic waves transmitted by the antenna 14 to be (completely or partially) shielded by the metallic material of the second box 10, as it could occur instead in the case the antenna 14 was outside such a second box.

According to another embodiment, the antenna 14 is being arranged so to be outside the second box 10 (but inside or outside the first box 7), but close to and facing the slot 16 (or another suitable opening) so to allow the irradiation towards the wireless peripheral devices $WM_1$-$WM_N$. The opening size in this case is being determined considering the length of the signal wave being irradiated by the antenna 14.

It should be noted that the telecommunication technology employed by the wireless device 4 and by the wireless peripheral devices $WM_1$-$WM_N$ allows to automatically and dynamically manage the communications when the execution device 2 is being replaced and therefore, the number and/or the type of peripheral control devices $AM_1$-$AM_N$, after the change of all or a part of the technology of the devices to be programmed $PD_1$-$PD_N$ is being changed.

The wireless device 4 and the wireless peripheral devices $WM_1$-$WM_N$, compliant with the Wireless LAN Wi-Fi 802.11ac standard, can adaptively minimise the transmitted power so to optimise the data transmission speed. The optimal condition occurs when the devices communicating with each other are at close range and in a propagation environment of the electromagnetic waves without interferences.

It should be noted that, in the case the antenna 14 extends inside the second box 10, the distance from the wireless peripheral devices $WM_1$-$WM_N$ is very short. Furthermore, in such a case, contingent noise/interference external signals are completely or at least partially shielded by the walls of the second box 10 that, if metallic, acts as a "Faraday cage". Advantageously, the second metallic box 10 is being electrically connected to ground.

Figure 3:
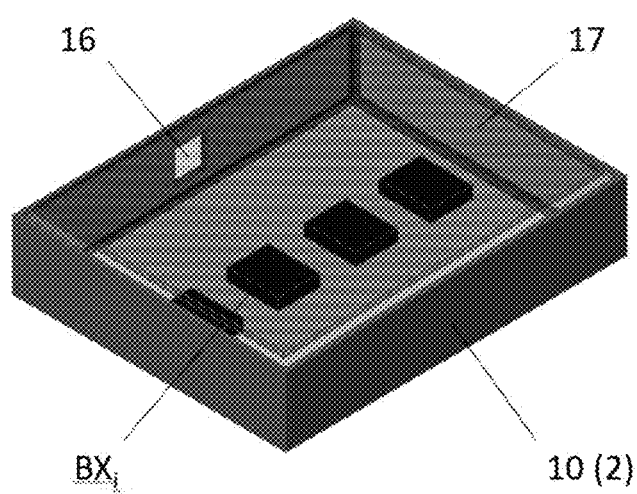
FIG. 3 shows as an example the inside of a box of a programming execution device included in said programming system.

According to a particularly advantageous embodiment, the internal walls of the second box 10 (e.g., if metallic) are covered or partially covered with an anti-reflective film 17 (FIG. 3) in the frequency band the wireless employed technology operates with. Such film 17 allowing to minimise the reflected electromagnetic waves (i.e. signal echoes) from the walls of the second box 10 that, otherwise, could overlap with amplitudes and different phases (i.e. destructive interference), leading to a signal distortion of interest and to the worsening of the signals received by the different components.

For the same reasons it is not excluded that such non-reflective film is being used to cover also the other areas of the management device 1 and/or the related first box 7. Having an optimised propagation environment of the electromagnetic signal allows to minimise the transmitted powers, and therefore the electromagnetic disturbances towards other devices and to maximise the performances in terms of data transmission frequency.

It should be noticed that according to the example using the Wireless LAN telecommunication technology, it is possible to use a maximum number of wireless peripheral devices $WM_1$-$WM_N$ equal to 255.

According to an operation example of the programming system 400, at a first stage, in the central control device 3 information about the identification and about the type of each device to be programmed $PD_1$-$PD_N$ are being stored, that can be of different type.

Additionally, in the central control device 3 further identification information are being stored allowing to associate each wireless peripheral device $WM_1$-$WM_N$ with the corresponding device to be programmed $PD_1$-$PD_N$. In the central control device 3 the data to be stored and the programming procedures relevant to the devices to be programmed $PD_1$-$PD_N$ are being saved.

Furthermore, at such first stage, the configuration parameters of each peripheral control device $AM_1$-$AM_N$ is being stored as well as configuration parameters of the devices to be programmed $PD_1$-$PD_N$.

At a second stage, the central control device 3 sends the wireless signals, via the wireless telecommunication device 4 and the antenna 14, that convey the data for the programming, the programming procedures, the parameters of the peripheral control devices $AM_1$-$AM_N$ and the configuration parameters of the devices to be programmed $PD_1$-$PD_N$.

Each peripheral control device $AM_1$-$AM_N$ receives, via the corresponding wireless peripheral device $WM_1$-$WM_N$, the data/parameters of interest and can, e.g., partially or completely store them before using or sending them to the corresponding device to be programmed $PD_1$-$PD_N$.

During a third stage, each peripheral control device $AM_1$-$AM_N$ deals with the management of the programming data transfer towards the corresponding device to be programmed $PD_1$-$PD_N$ according to the programming procedures and considering the related configuration parameters.

For example, the described stages can occur in an immediately consecutive or in a delayed manner or they can be partially overlapped. It is possible, according to a particular embodiment, to make the programming of the devices $PD_1$-$PD_N$ occur at, at least, partially overlapped time intervals.

According to a particularly advantageous embodiment, all or part of the peripheral control devices $AM_1$-$AM_N$ are being provided with at least one volatile and/or non-volatile large memory with reading/writing speed performances suitable to the programming/verification speeds required by the devices to be programmed $PD_1$-$PD_N$.

In this way, it is possible to send a large amount of data to be programmed/verified to the devices to be programmed $PD_1$-$PD_N$ being assembled on the PCBA boards. As these data are often kept unchanged on a number of programming cycles, it is possible to store them on the peripheral control devices $AM_1$-$AM_N$ so not to make them repeatedly pass on the wireless telecommunication system, reducing the data traffic and the execution time of the programming procedures.

As shown by the previous description, both the programming system and device present a connection mode between the central control device 3 and the peripheral control devices $AM_1$-$AM_N$ that is less complex, expensive and bulky than that of the prior art not being based on the use of cables.

Furthermore, the use of the wireless telecommunication device 4 and of the wireless telecommunication peripheral devices $WM_1$-$WM_N$ allows the use of communication standards, keeping high performances in terms of data transmission speed.

A further advantage is due to the possibility to make the installation of further peripheral control devices in the execution device 2 easier, without having to change the whole connection system. Indeed, the described device allowing to avoid the limitation imposed by the connector installed on the main part of the machine being of a known type, in terms of maximum number of connections and therefore of peripheral devices being connectable to the central device.

The described programming device avoids also the limitation imposed by the connector related to the guaranteed number of coupling cycles that brings about the utilization limit of the main machine and of the different interchangeable parts.

REFERENCE SIGN LIST programming system 400
programming device 300
devices to be programmed $PD_1$-$PD_N$
management device 1
programming execution device 2
central control device 3
wireless telecommunication device 4
connection 5
first box module 6
ELTR block
first box 7
wired connection 8
high speed connection 9
second box 10
shelf 11
separation wall 12
guides 13
wireless telecommunication peripheral devices $WM_1$-$WM_N$
peripheral control device $AM_1$-$AM_N$
second box module $BX_1$-$BX_N$
antenna 14
cable 15
slot 16

The invention claimed is:

1. Programming device (300) including:
a central control device (3) configured to manage the programming of a plurality of external devices to be programmed ($PD_1$-$PD_N$) and such as to store a plurality of programming data, a plurality of programming procedures and a plurality of configuration parameters;
a plurality of peripheral control devices ($AM_1$-$AM_N$) each connectable to a corresponding external device to be programmed ($PD_1$-$PD_N$) and such as to receive from the central control device (3) a corresponding sub-plurality of programming data intended for the corresponding external device to be programmed ($PD_1$-$PD_N$), a corresponding sub-plurality of programming procedures of the corresponding external to be programmed ($PD_1$-$PD_N$), and a corresponding sub-plurality of configuration parameters of the corresponding external device to be programmed ($PD_1$-$PD_N$) and of the corresponding peripheral control device ($AM_1$-$AM_N$);
characterised by the fact to furthermore include:
a first wireless telecommunication device (4) connected to the central control device (3) and such as to radiate wireless signals, corresponding to the plurality of programming data, to the plurality of programming procedures and to the plurality configuration parameters;
a plurality of second wireless telecommunication devices ($WM_1$-$WM_N$) each connected to one of said peripheral control devices ($AM_1$-$AM_N$) and each intended for receiving by means of said wireless signals the corresponding sub-plurality of programming data, the corresponding sub-plurality of programming procedures and the corresponding sub-plurality of configuration parameters.

2. Device (300) according to claim 1, wherein the first wireless telecommunication device (4) and the second wireless telecommunication devices ($WM_1$-$WM_N$) are such as to receive/send signals with frequencies included between 0 and 300 GHz.

3. Device (300) according to claim 2, wherein the first wireless telecommunication device (4) and the second wireless telecommunication devices ($WM_1$-$WM_N$) are such as to work according to the Wi-Fi technology.

4. Device (300) according to claim 1, wherein:
the central control device (3) and the first wireless telecommunication device (4) are housed in a first box (6; 7);
the plurality of peripheral control devices ($AM_1$-$AM_N$) and the plurality of second wireless telecommunication devices ($WM_1$-$WM_N$) are house in a second box (10) separated from the first box (6,7).

5. Device (300) according to claim 4, wherein said second box (10) includes metallic walls.

6. Device (300) according to claim 4, furthermore including an antenna (14) connected by means of a cable (15) to the first wireless telecommunication devices (4) and such as to radiate said wireless signals.

7. Device (300) according to claim 6, wherein the antenna extends into the second box (10).

8. Device (300) according to claim 5, wherein said second box (10) includes a wall provided with an opening (16) for the introduction into the second box of said antenna (14).

9. Device (300) according to claim 6, wherein:
the antenna (14) is arranged outside the second box (10) closed to an external part of the second box (10);
the second box (10) is provided with a fissure such as to allow the radiation of the wireless signals inside the second box (10) to receive them by the plurality of second wireless telecommunication devices ($WM_1$-$WM_N$).

10. Device (300) according to claim 5, furthermore including: an antireflection film (17) arranged on internal sides of said metallic walls of the second box (10) to cover them at least partially; the antireflection film (17) being such to reduce the reflections of said wireless signals inside the second box (10).

11. Device (300) according to claim 1, wherein: the central control device (3) and each of said peripheral control devices ($AM_1$-$AM_N$) each including a corresponding processing unit and corresponding volatile and non-volatile memories.

12. Device (300) according to claim 1, wherein said device (300) is such as of being able to work in a distributed programming system of the In-System Programming type.

13. Device (300) according to claim 4, wherein the second box (10), containing the plurality of peripheral control devices ($AM_1$-$AM_N$) and the plurality of second wireless telecommunication devices ($WM_1$-$WM_N$), is removable and replaceable.

14. Programming system (400) including:
a programming device (300) realised according to claim 1;
a plurality of devices to be programmed ($PD_1$-$PD_N$), each receiving a sub-plurality of programming data and a sub-plurality of configuration parameters.

15. Programming system (400) according to claim 14, wherein:
the programming system is an In-System Programming-type;
the devices to be programmed ($PD_1$-$PD_N$) are mounted on Printed Circuit Board Assembly boards.

16. Programming system (400) according to claim 15, wherein said system is such as to carry out functionality tests of the devices to be programmed ($PD_1$-$PD_N$) that are devices under test.

* * * * *